United States Patent
Ainscow et al.

(10) Patent No.: US 11,755,419 B2
(45) Date of Patent: Sep. 12, 2023

(54) UTILIZING SPARE NETWORK NODES FOR DEDUPLICATION FINGERPRINTS DATABASE

(71) Applicant: INTERNATIONAL BUSINESS MACHINES CORPORATION, Armonk, NY (US)

(72) Inventors: Alexander H. Ainscow, Winchester (GB); Ben Sasson, North Baddesky (GB); Gordon Hutchison, Eastleigh (GB); Miles Mulholland, Hampshire (GB); Lee J. Sanders, Chichester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 16/123,249

(22) Filed: Sep. 6, 2018

(65) Prior Publication Data
US 2020/0081797 A1  Mar. 12, 2020

(51) Int. Cl.
*G06F 11/14* (2006.01)
*G06F 3/06* (2006.01)
(Continued)

(52) U.S. Cl.
CPC .......... *G06F 11/1453* (2013.01); *G06F 3/065* (2013.01); *G06F 3/0614* (2013.01);
(Continued)

(58) Field of Classification Search
CPC .. G06F 11/1453; G06F 3/0614; G06F 3/0641; G06F 3/065; G06F 3/0683; G06F 11/1469
See application file for complete search history.

(56) References Cited

U.S. PATENT DOCUMENTS

| | | | |
|---|---|---|---|
| 8,010,829 B1 * | 8/2011 | Chatterjee | G06F 11/2061 714/4.11 |
| 8,352,608 B1 * | 1/2013 | Keagy | G06F 8/63 709/226 |

(Continued)

OTHER PUBLICATIONS

Chang et al., "International Journal of Distributed Sensor Networks", Dynamic Deduplication Decision in a Hadoop Distribution File System, http://journals.sagepub.com/doi/full/10.1155/2014/630380, Apr. 27, 2014, pp. 1-33.

(Continued)

*Primary Examiner* — Andrew J Cheong
(74) *Attorney, Agent, or Firm* — Rakesh Roy

(57) ABSTRACT

Method, apparatus, and computer program product utilizing a hot-spare node in a storage network having a deduplication fingerprints database. A plurality of nodes is provided in the storage network including at least one active node and at least one hot-spare node. A portion of the deduplication fingerprints database is stored on each active node and on each hot-spare node. Data from the deduplication fingerprints database is provided from at least one of said at least one hot-spare node during normal operation. Responsive to a failure of one of said at least one active node, a portion of the deduplication fingerprints database associated with data stored on the failed one of said at least one active node is retained on one of the at least one hot-spare node. The failed one active node is replaced with one of the at least one hot-spare node.

12 Claims, 7 Drawing Sheets

(51) Int. Cl.
  *G06F 11/16* (2006.01)
  *G06F 11/20* (2006.01)
(52) U.S. Cl.
  CPC .......... *G06F 3/0641* (2013.01); *G06F 3/0683* (2013.01); *G06F 11/1469* (2013.01); *G06F 11/1662* (2013.01); *G06F 11/20* (2013.01); *G06F 11/2094* (2013.01)

(56) References Cited

U.S. PATENT DOCUMENTS

| | | | |
|---|---|---|---|
| 8,479,037 B1 | 7/2013 | Chatterjee et al. | |
| 8,984,328 B2 | 3/2015 | Gil et al. | |
| 9,471,384 B2 | 10/2016 | Messerli | |
| 2006/0155912 A1* | 7/2006 | Singh | G06F 9/5088 711/6 |
| 2012/0303998 A1* | 11/2012 | Sun | G06F 11/2041 714/4.11 |
| 2014/0047086 A1 | 2/2014 | Klimetschek et al. | |
| 2014/0201439 A1* | 7/2014 | Sasaki | G06F 11/1092 711/114 |
| 2015/0039572 A1* | 2/2015 | Raghuwanshi | G06F 11/1004 707/692 |
| 2015/0127975 A1* | 5/2015 | Patterson | G06F 11/1076 714/15 |
| 2016/0105313 A1* | 4/2016 | Jha | G06F 11/1451 709/217 |
| 2017/0091232 A1* | 3/2017 | Ghanbari | G06F 16/215 |
| 2017/0206149 A1* | 7/2017 | Aron | H04L 67/1097 |
| 2017/0351698 A1* | 12/2017 | Ioannou | G06F 3/0601 |
| 2019/0171563 A1* | 6/2019 | Wallace | G06F 3/0608 |

OTHER PUBLICATIONS

Zhu et al., "Avoiding the Disk Bottleneck in the Data Domain Deduplication File System", ACM Digital Library, https://dl.acm.org/citation.cfm?id=1364831, Feb. 26-29, 2008, pp. 1-16.
Xia et al., "SiLo: A Similarity-Locality based Near-Exact Deduplication Scheme with Low Ram Overhead and High Throughput", ACM Digital Library, https://dl.acm.org/citation.cfm?id-2002207, Jun. 15-17, 2011, pp. 1-16.
Liu et al., "Hadoop Based Scalable Cluster Deduplication for Big Data", IEEE, http://ieeexplore.ieee.org/document/7756216/, Jun. 27-30, 2016, pp. 1-3.
IBM Knowledge Center, "Adding Hot-Spare Nodes to a System", https://www.ibm.com/support/knowledgecenter/en/STVLF4_8.1.1/spect., printed Feb. 12, 2018, pp. 1-3.

* cited by examiner

UTILIZING SPARE NETWORK NODES FOR DEDUPLICATION FINGERPRINTS DATABASE

BACKGROUND

The present invention relates to storage networks having multiple storage nodes, and more specifically to such storage networks having hot-spare storage nodes.

SUMMARY

According to an embodiment of the invention, a computer-implemented method of utilizing hot-spare nodes in a storage network, the storage network having a deduplication fingerprints database, comprising: providing a plurality of nodes in said storage network, comprising at least one active node and at least one hot-spare node; storing, on each of said at least one active node, a portion of said deduplication fingerprints database; storing, on each of said at least one hot-spare node, a portion of said deduplication fingerprints database; providing, from at least one of said at least one hot-spare node, data from said deduplication fingerprints database during normal operation of said storage network; responsive to failure of one of said at least one active node, one of said at least one hot-spare node retaining a portion of said deduplication fingerprints database associated with data stored on the failed one of said at least one active node; and replacing said failed one of said at least one active node with said one of said at least one hot-spare node.

Embodiments of the invention provide an apparatus for utilizing hot-spare nodes in a storage network, comprising: a storage network having a deduplication fingerprints database and a plurality of nodes, said plurality of nodes comprising: at least one active node; and at least one hot-spare node, a portion of said deduplication fingerprints database being stored on each of said at least one hot-spare node, data from said deduplication fingerprints database being provided from said hot-spare node during normal operation of said storage network; responsive to failure of one of said at least one active node: one of said at least one hot-spare node retains a portion of said deduplication fingerprints database associated with data stored on the failed one of said at least one active node; and said failed one of said at least one active node is replaced with said one of said at least one hot-spare node.

Embodiments of the invention also provide a computer program product for utilizing hot-spare nodes in a storage network, the storage network having a deduplication fingerprints database and a plurality of nodes, comprising at least one active node and at least one hot-spare node, the computer program product comprising: a computer readable storage medium having program instructions embodied therewith, to the program instructions comprising: program instructions store, on each of said at least one active node, a portion of said deduplication fingerprints database; program instructions to store, on each of said at least one hot-spare node, a portion of said deduplication fingerprints database; program instructions to provide, from at least one of said at least one hot-spare node, data from said deduplication fingerprints database during normal operation of said storage network; program instructions to, responsive to failure of one of said at least one active node, to retain in one of said at least one hot-spare node a portion of said deduplication fingerprints database associated with data stored on the failed one of said at least one active node; and to replace said failed one of said at least one active node with said one of said at least one hot-spare node.

BRIEF DESCRIPTION OF THE DRAWINGS

Preferred embodiments of the present invention will now be described in more detail, by way of example only, with reference to the accompanying drawings, in which.

DETAILED DESCRIPTION

In Hot-Spare Node (HSN) environments, additional spare idle nodes are present in a storage network which do not contribute to input/output (I/O) processing. A hot-spare node can become online, handling I/O operations, automatically if it is needed. For example, if a node fails, an available hot-spare node that matches the failed node may be activated automatically and moved to an Online Spare state. The hot-spare node may handle I/O operations for the failed node until the failed node comes back online. After the failed node comes back online, the hot-spare node returns to a Spare state, which indicates that it can be automatically swapped for other failed nodes on the network.

The provision of additional spare idle nodes, which consume resources such as initial cost, rack space, power, cooling and the like, and which have no benefit outside a failure scenario is not optimal for overall system performance. It would be desirable to be able to benefit from the additional spare idle nodes to improve system performance and provide a more robust network.

Figure 1:
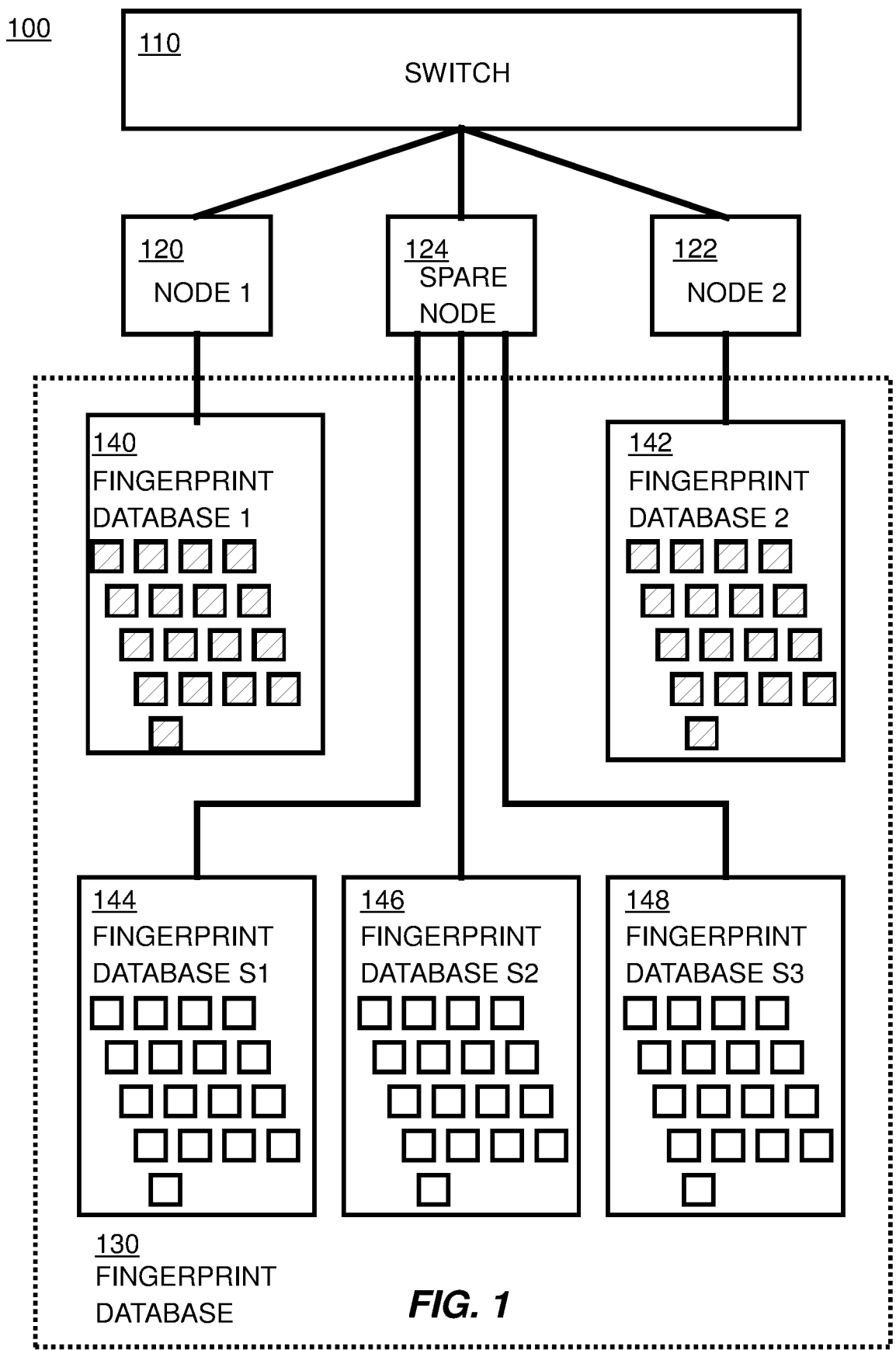
FIG. 1 is a block diagram of a storage network having multiple nodes including a hot-spare node.

Referring to FIG. 1, which is a block diagram of a storage network 100 having multiple nodes 120-124 including a hot-spare node 124. Switch 110 connects hosts (not shown), which provide data to and receive data from the storage network 100, with multiple nodes 120-124. Although FIG. 1 shows three nodes 120-124, in embodiments of the present invention any number of nodes 120-124 may be used, except for a single node 120-124.

A deduplication fingerprints database 130 comprises a fingerprint, that is a digital signature, for every chunk of data stored in the storage network 100. By detecting and eliminating duplicate data, data deduplication technologies can shrink the amount of storage space used, reduce network overhead of data transmission and save network bandwidth. Data deduplication typically consists of three steps: chunking, duplicate detection and storage. Data to be stored is divided into chunks, and then a fingerprint of each chunk is calculated. A check is made as to whether the calculated fingerprint matches an existing fingerprint already stored in the deduplication fingerprints database 130. In this way, a chunk may be classified as redundant if a corresponding fingerprint is already stored in the deduplication fingerprints database 130 or unique if a corresponding fingerprint is not already stored in the deduplication fingerprints database 130. If a chunk is unique, then the chunk is stored in its entirety and its fingerprint added to the deduplication fingerprints database 130. If a chunk is redundant, then a pointer to where the chunk can be found is stored instead of storing a full copy of the chunk. Deduplication can eliminate redundant data not only within a specific file, but also between different files, unlike data compression, which operates only over a single file.

Deduplication fingerprints database 130 is typically split into a number of portions 140-148 which is greater than the number of nodes 120-124 in the network 100. In an embodiment, the number of portions may be 64. Deduplication fingerprints database 130 may take any form so long as it is suitable for the storage and retrieval of fingerprints generated as described above.

In prior art deduplication fingerprints databases 130 these portions 140, 142 are distributed between the nodes 120, 122 as evenly as possible, but with no portions 140, 142 being distributed to hot-spare nodes 124. Hot-spare node 124 is connected to the storage network 100, but does not contribute to the functioning of the storage network 100 until a failure of an active node 120, 122 occurs. In a prior art hot-spare node 124, only an area of storage 146 corresponding to the size of areas of storage 140, 142 in other nodes 120, 122 is allocated for the storage of portions 140-148 of the deduplication fingerprints database 130 for use when the hot-spare node 124 is brought online to replace a failed node 120, 122. In embodiments of the invention, although these portions 140, 142 are distributed between the nodes 120, 122 as evenly as possible, there may be variations in the number of portions 140, 142 distributed to each node.

In prior art networks, responsive to a failure of a node 120, 122, such as node 1 120, the failing node 120 is taken offline and is replaced by hot-spare node 124, with hot-spare node 124 taking over responsibility for any portion 140 of the deduplication fingerprints database 130 which was stored in failing node 1 120. Although FIG. 1 shows a single hot-spare node 124, embodiments of the invention may comprise any number of hot-spare nodes 124. However, the area of storage set aside for storing portion 146 of the deduplication fingerprints database 130 is initially unpopulated. This causes deduplication matches to be reduced until the portion 146 of the deduplication fingerprints database 130 is populated, as a response to I/O from the host (not shown) through the switch 110 or through a background operation which requires backend I/O and CPU cycles, thus reducing performance of the storage network 100.

Figure 2:
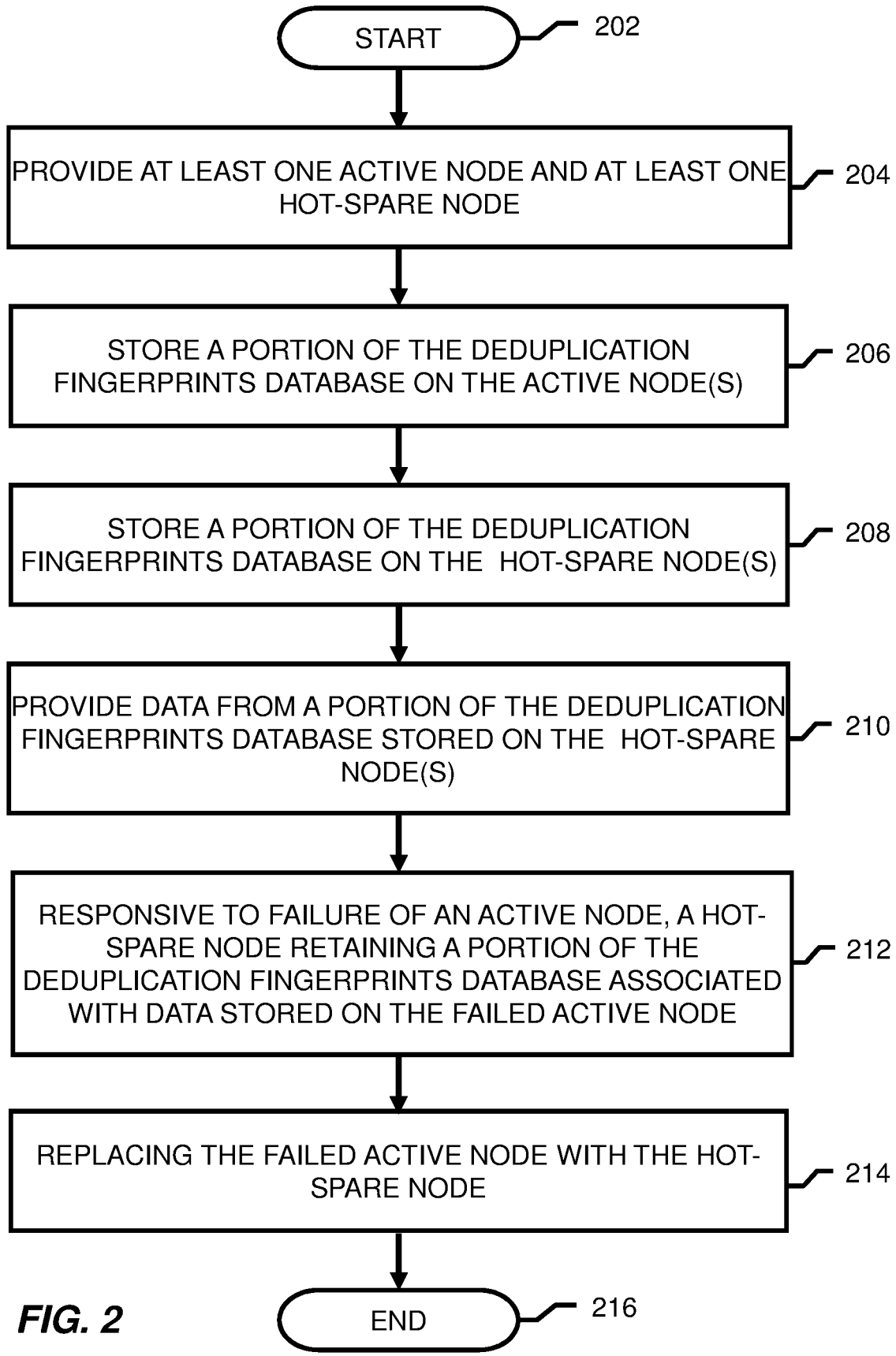
FIG. 2 is a flow chart of an embodiment of a computer-implemented method of utilizing a hot-spare node of the storage network of FIG. 1 to store a portion of a deduplication fingerprints database according to the present invention.

Referring to FIG. 2, which is a flow chart of an embodiment of a computer-implemented method of utilizing a hot-spare node 124 of the storage network 100 of FIG. 1 to store a portion 144-148 of a deduplication fingerprints database 130. The method starts at step 202. At step 204, a plurality of nodes 120-124 in the network 100 are provided, comprising at least one active node 120, 122 and at least one hot-spare node 124. In the example of FIG. 1, two active nodes 120, 122 and one hot-spare node 124 are shown, however any number of active nodes 120, 122 and any number of hot-spare nodes 124 may be used. Typically, the number of both active nodes 120, 122 and of hot-spare nodes 124 will be much greater than shown in FIG. 1.

At step 206, a portion 140, 142 of the deduplication fingerprints database 130 is stored on each of the active nodes 120-122. At step 208, a portion 144-148 of the deduplication fingerprints database 130 is stored on each of the hot-spare nodes 124. In the prior art, the hot-spare nodes 124 are not used for the storage of any portions 140-148 of the deduplication fingerprints database 130. Deduplication fingerprints database 130 characteristics are different from normal read/write cache data in that it is not required to be 100% accurate. This allows the hot-spare node 124 to be used, thus providing a more balanced environment that can survive failures more gracefully and with less impact on the deduplication match ratio, whilst not having to keep the hot-spare node 124 in perfect sync with the other active nodes 120-122 as would be required with normal read/write cache data.

Further, by expanding the deduplication fingerprints database 130 into storage associated with more nodes 124, the number of fingerprints, and hence deduplication matches, that can be stored is increased, thus helping to improve the deduplication ratio during non-failure scenarios. Following a failure, the storage network 100 may maintain more fingerprints than if there were none stored in hot-spare node 124. As the deduplication fingerprints database 130 is divided between not just the active nodes 120-122, but also the hot-spare nodes 124, the loss of a single active node 120-122 results in the loss of a smaller portion of the deduplication fingerprints data. The deduplication fingerprints database 130 is typically split into a number of portions 140-148, for example 64, which is greater than the number of nodes 120-124 in the network 100. These portions 140-148 are typically distributed between the nodes 120-124 as evenly as possible. The additional node 120-124, that is the hot-spare node 124, allows more of these portions 140-148 to remain available following a failure. This improvement is provided without the need for any more inter-node communication, as cross node lookup of the deduplication fingerprints database 130 should have taken place anyway. Further there is no need to interlock between active nodes 120, 122 and hot-spare nodes 124 because the deduplication fingerprints database 130 only provides hints as to possible duplications.

Although a hot-spare node 124 has the same overall amount of memory as an active node 120, 122, since it does not actually serve I/O, it can dedicate more memory to the storage of fingerprints from the deduplication fingerprints database 130 than an active node 120, 122 because it does not need to use memory for cache, control blocks or the like. This amount of extra memory available for the storage of fingerprints from the deduplication fingerprints database 130 can be significant and much more than that available in an active node 120-122. This means that the deduplication fingerprints database 130 coverage and the overall storage network 130 deduplication performance can be improved by using the otherwise redundant hot-spare node 124. Referring to FIG. 1, this is illustrated by hot-spare node 124 having three portions 144-146 of deduplication fingerprints database 130 in comparison to active nodes 120, 122 having one portion 140, 142 each of deduplication fingerprints database 130. Although nodes 120, 122 are shown in FIG. 1 as having a single portion 140, 142 and hot-spare node 124 is shown as having three portions 144-148, any number of portions 140-148 may be associated with each of the nodes 120-124, subject to the amount of memory available to store the portions 140-148. As mentioned above, deduplication fingerprints database 130 is typically split into a number of portions 140-148 which is greater than the number of nodes 120-124 in the network 100 and may, for example, be split into 64 sections. In an exemplary embodiment, portions 140-146 may comprise 13 sections each and portion 148 may comprise 12 sections.

At step 210, during normal operation of the network, data from the portions 144-148 of the deduplication fingerprints database 130 stored on the hot-spare node 124 is provided so as to help to improve the deduplication ratio during non-failure scenarios.

At step 212, responsive to failure of one of the active nodes 120, one of the hot-spare nodes 124 retains a portion 146 of the deduplication fingerprints database 130 associated with data stored on the failed active node 120. At step 214, the hot-spare node 124 replaces the failed active node 120 and takes over that node's 120 work and starts serving I/O. The storage network 100 will then behave just like a storage network 100 that never had a spare node 124, from both a performance point of view and a deduplication match point of view, there being no required "warming up" of the deduplication on the node whilst the deduplication fingerprints database 130 is populated. In embodiments with more than one hot-spare node 124, the storage network 100 will then behave just like a storage network 100 that has one less spare node 124, from both a performance point of view and a deduplication match point of view. The method ends at step 216.

In an embodiment in which a hot-spare node 124 is shared between more than one storage network 100, then each of the storage networks 100 sharing the hot-spare node 124 can benefit from the additional memory that the hot-spare node 124 provides. Once the hot-spare node 124 replaces a failed active node 120, 122 in one of the storage networks 100, the hot-spare node 124 discards the portions 144-148 of the deduplication fingerprints database 130 relating to others of the storage networks 100 and is dedicated solely to the storage network 100 in which it has replaced the failed active node 120, 122.

In an embodiment the hot-spare node 124 is implemented in virtual spare hardware. This has the particular advantage that maintaining the deduplication fingerprints database 130 is mostly a memory task and is not CPU intensive.

Figure 3:
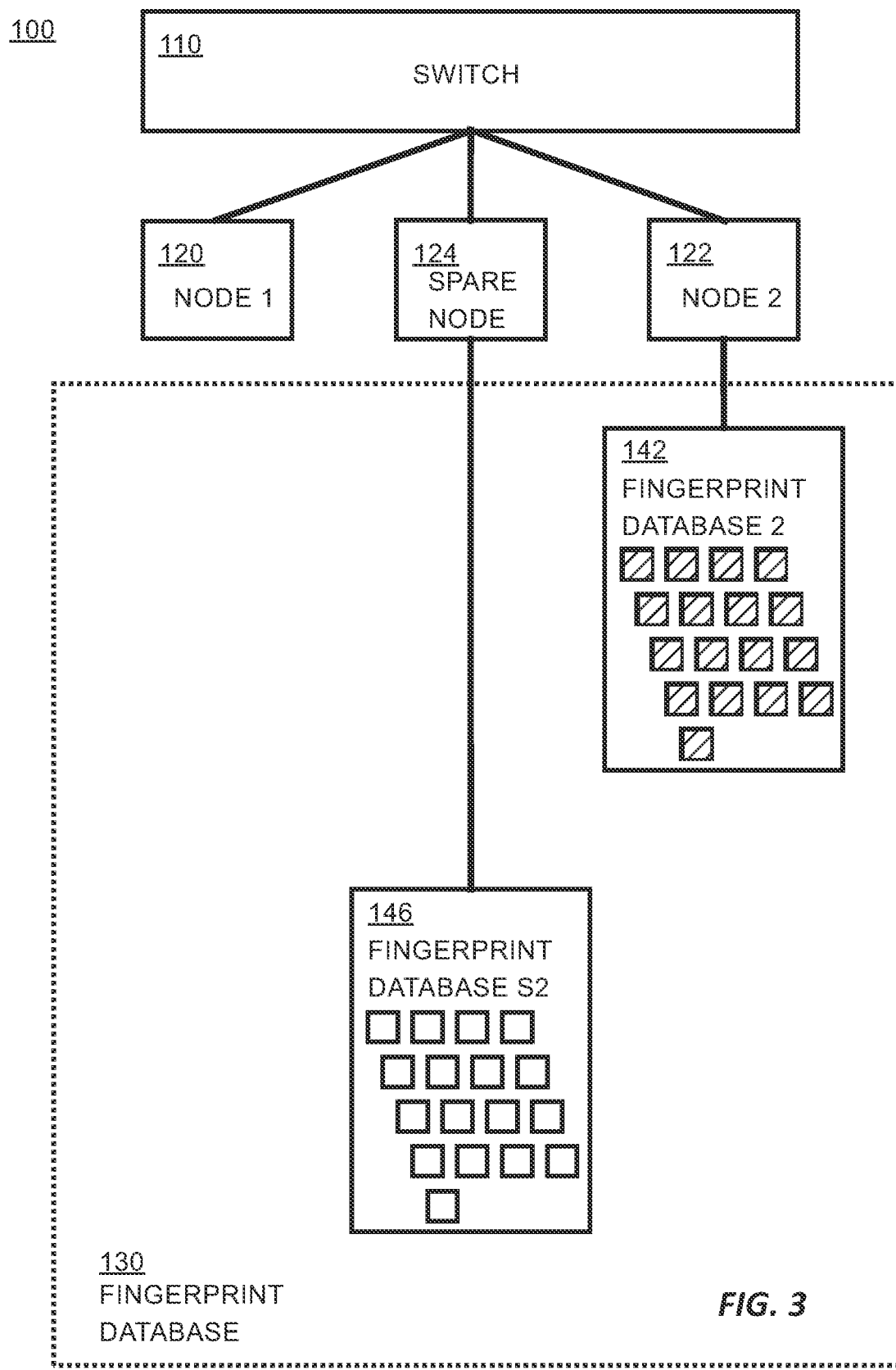
FIG. 3 is a block diagram of the storage network of FIG. 1, after failure of a node.

Referring to FIG. 3, which is a block diagram of the storage network 100 of FIG. 1, after failure of an active node 120. Responsive to the failure of one of the active nodes 120, one of the hot-spare nodes 124 retains a portion 146 of the deduplication fingerprints database 130 associated with data stored on the failed active node 120. The hot-spare node 124 replaces the failed active node 120, takes over that node's 120 work and starts serving I/O. The storage network 100 will then behave just like a network 100 that never had a spare node 124, from both a performance point of view and a deduplication match point of view, there being no required "warming up" of the deduplication on the node 124 whilst the deduplication fingerprints database 130 is populated. In embodiments with more than one hot-spare node 124, the storage network 100 will then behave just like a storage network 100 that has one less spare node 124, from both a performance point of view and a deduplication match point of view.

Figure 4:
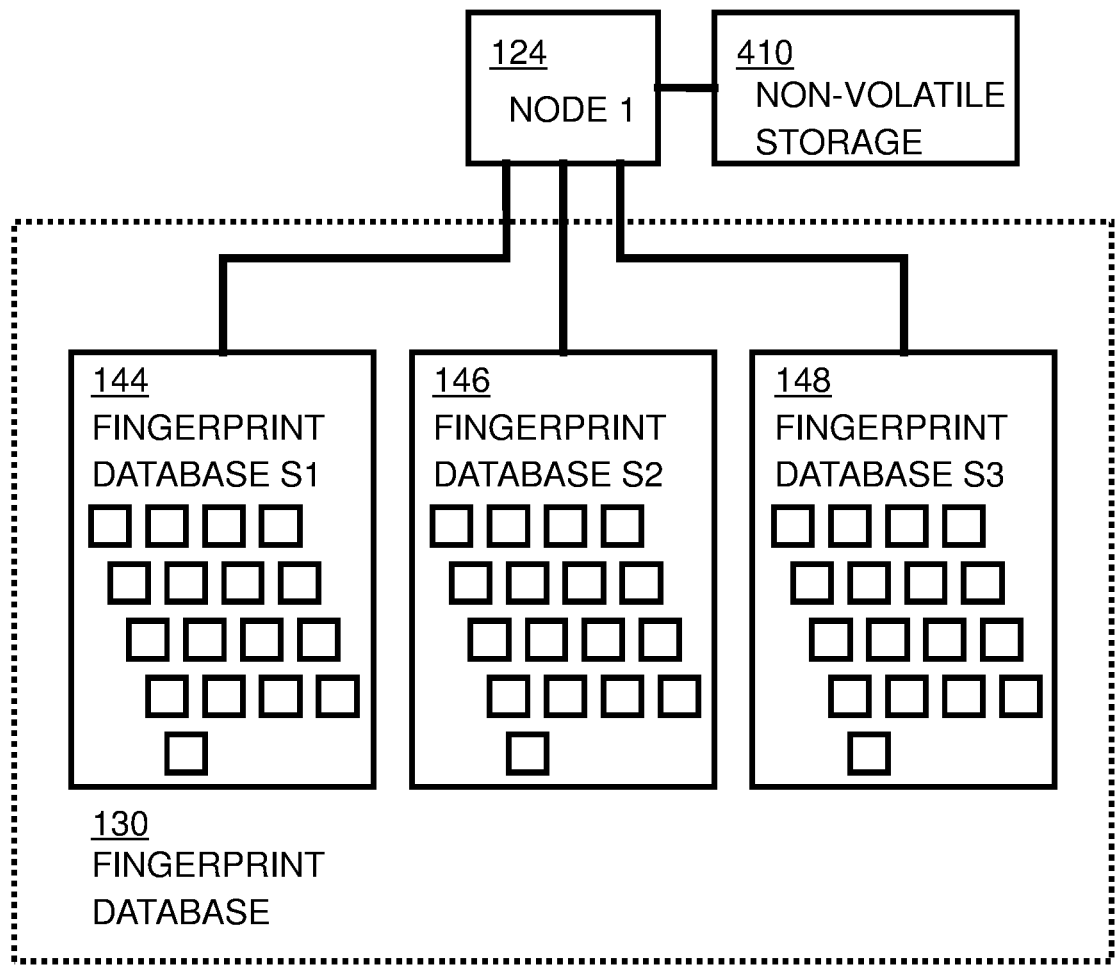
FIG. 4 is a block diagram of a node of FIG. 1.

FIG. 4 is a block diagram of a hot-spare node 124 of FIG. 1. Hot-spare node 124 and fingerprints database portions 144-148 have been described above with reference to FIG. 1. Hot-spare node 124 also comprises a non-volatile storage 410. Non-volatile storage 410 is also present in active nodes 120, 122, but in the active nodes 120, 122, non-volatile storage 410 is used to store data that is needed in the event of a power outage. That is not needed in hot-spare node 124 because as a hot-spare node 124, it is not participating in interactions with hosts (not shown) connected to the storage network 100. In case of a failure on the hot-spare node 124 whilst it is replacing a failed node 120 in the storage network 100, that is a second failure, the hot-spare node 124 dumps whatever memory it needs to the non-volatile storage 410, overwriting the portions of the deduplication fingerprints database 130 that were stored in the non-volatile storage 410 as the actual memory, such as cache contents and the like, takes precedence over portions of the deduplication fingerprints database 130.

Figure 5:
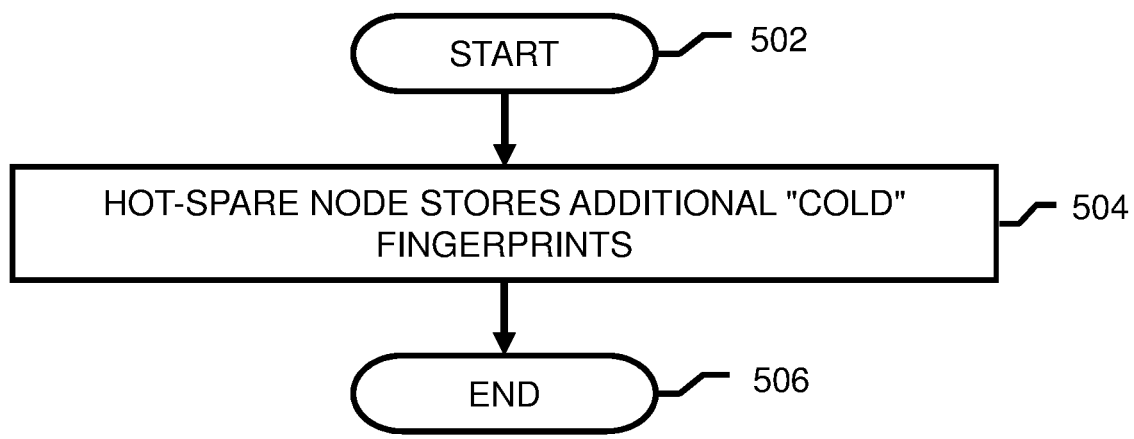
FIG. 5 is a flow chart of an embodiment of the computer-implemented method of FIG. 1 in which the hot-spare node stores additional "cold" fingerprints.

FIG. 5 is a flow chart of an embodiment of the computer-implemented method of FIG. 3 in which the hot-spare node 124 stores additional "cold" fingerprints in the non-volatile memory 410. "Cold" fingerprints are fingerprints that were previously, but are not presently, in use by the active deduplication fingerprints database 130, but which have been used in the past and which may prove useful to use in the future.

The method starts at step 502. At step 504, the hot-spare node 124 stores additional "cold" fingerprints from the deduplication fingerprints database 130 in its non-volatile storage 410. Using such storage allows a considerable increase in the number of portions 144-148 that can be stored in the hot-spare node 124. In a typical embodiment, the increase in the size of storage available may be an order of magnitude without the cost of backend I/O. The method ends at step 506.

Figure 6:
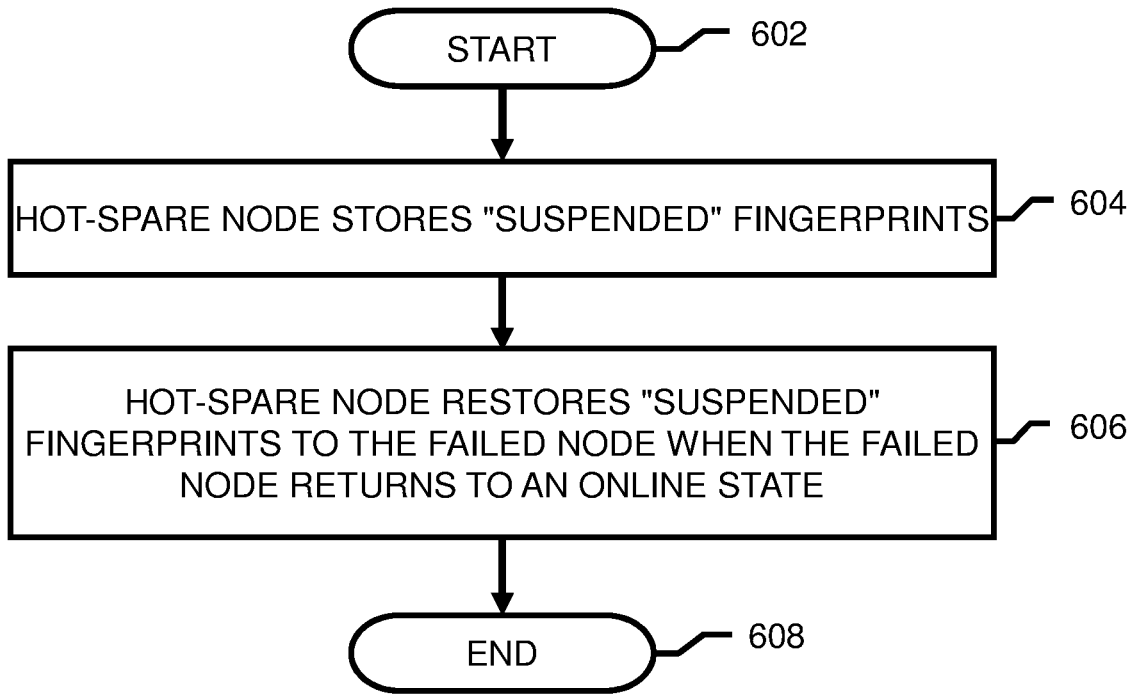
FIG. 6 is a flow chart of an embodiment of the computer-implemented method of FIG. 1 in which the hot-spare node stores "suspended" fingerprints.

FIG. 6 is a flow chart of an embodiment of the computer-implemented method of FIG. 3 in which the hot-spare node 124 stores "suspended" fingerprints. "Suspended" fingerprints are the fingerprints that were stored in the portion 144-148 of the deduplication fingerprints database 130 that was located on the hot-spare node 124. This portion 144-148 of the deduplication fingerprints database 130 may be de-staged to non-volatile storage 410 whilst the hot-spare node 124 is replacing a failed node 120, 122 in the storage network 100. When the failed node 120, 122 comes back online, for example, after it has been repaired or replaced, this portion 144-148 of the deduplication fingerprints database 130 can then be read from non-volatile storage 410 and restored.

The method starts at step 602. At step 604, the hot-spare node 124 stores "suspended" fingerprints from the deduplication fingerprints database 130 in the non-volatile storage 410. The "suspended" fingerprints are the fingerprints that were stored on the failed node 120. At step 606, the hot-spare node 124 restores the "suspended" fingerprints of the deduplication fingerprints database 130 from its non-volatile storage 410 to the failed node 120 when the failed node 120 returns to an online state. This is achieved by simply paging this portion of the deduplication fingerprints database 130 into memory and thus no costly repopulation of the deduplication fingerprints database 130 is needed. The method ends at step 608.

Figure 7:
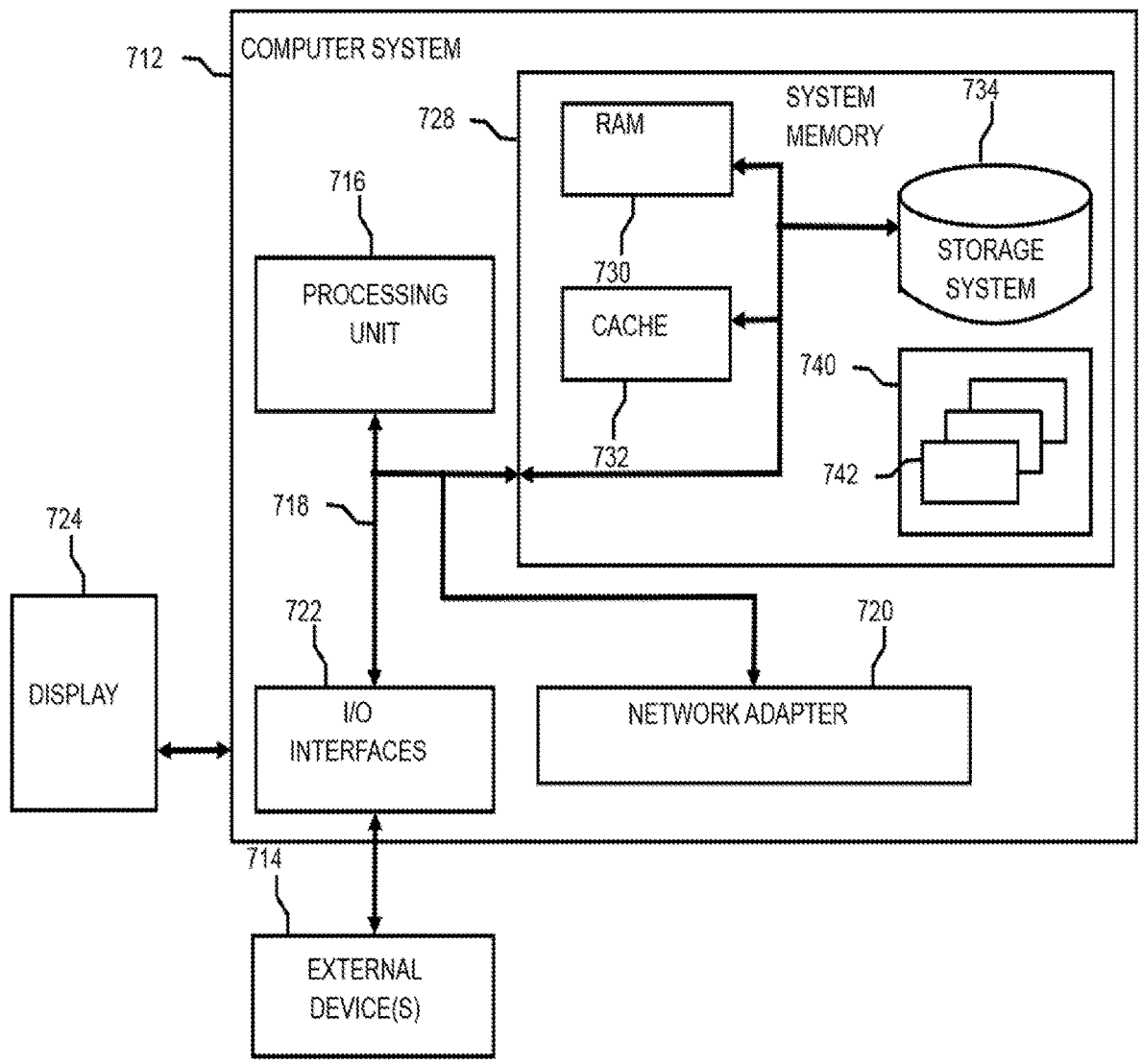
FIG. 7 is a block diagram of a computer system according to an embodiment of the present invention.

Referring now to FIG. 7, a schematic of an example of computing system is shown. Computing system 712 is only one example of a suitable computing system and is not intended to suggest any limitation as to the scope of use or functionality of embodiments of the invention described herein. Regardless, computing system 712 is capable of being implemented and/or performing any of the functionality set forth hereinabove.

Computer system/server 712 is operational with numerous other general purpose or special purpose computing system environments or configurations. Examples of well-known computing systems, environments, and/or configurations that may be suitable for use with computer system/ server 712 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of utilizing hot-spare nodes in a storage network having a deduplication fingerprints database, the method comprising:

providing a plurality of nodes in a storage network having a deduplication fingerprints database, wherein the deduplication fingerprints database eliminates redundant data, the storage network comprising at least one active node including an active node storage and at least one hot-spare node including a hot-spare node storage, wherein the at least one active node does not include any hot-spare node storage, wherein the deduplication fingerprints database is distributed between the at least one active node and the at least one hot-spare node during a non-failure operation of the storage network, wherein the non-failure operation of the storage network includes the at least one active node in a functioning state;

storing, on the active node storage of the at least one active node, a first portion of unique fingerprints of the deduplication fingerprints database, wherein the first portion of unique fingerprints corresponds to data that is not redundantly stored;

storing, on the hot-spare node storage of the at least one hot-spare node that is explicitly separated from the at least one active node and the active node storage, a second portion of unique fingerprints of the deduplication fingerprints database during the non-failure operation of the storage network, wherein the second portion of unique fingerprints corresponds to data that is not redundantly stored, wherein, relative to the at least one active node, the at least one hot-spare node does not serve input/output (I/O) operations and includes a larger memory allocation for storing the deduplication fingerprints database during the non-failure operation of the storage network;

responsive to providing, during the non-failure operation of the storage network, data from the at least one hot-spare node associated with the stored second portion of unique fingerprints of the deduplication fingerprints database, improving a deduplication ratio of the storage network during the non-failure operation of the storage network;

responsive to a failure operation of the storage network, wherein the failure operation includes a failed active node of the at least one active node, retaining on one of the at least one hot-spare node, a portion of the first portion of unique fingerprints of the deduplication fingerprints database associated with data stored on the failed active node, wherein the at least one hot-spare node is dedicated to retaining the portion of the first portion of unique fingerprints of the deduplication fingerprints database associated with data stored on the failed active node;

replacing the failed active node with the one of the at least one hot-spare node;

storing suspended fingerprints from the deduplication fingerprints database in a non-volatile storage associated with the at least one hot-spare node while the at least one hot-spare node is replacing the failed active node, wherein the suspended fingerprints were stored on the failed active node; and in response to the failed active node returning to an online state, paging the suspended fingerprints from the non-volatile storage to restore the suspended fingerprints to the failed active node.

2. The computer-implemented method of claim 1, further comprising storing additional cold fingerprints in non-volatile memory associated with the at least one hot-spare node, the additional cold fingerprints previously in use but not presently in use in said deduplication fingerprints database.

3. The computer-implemented method of claim 1, wherein the at least one hot-spare node is shared between more than one storage network.

4. The computer-implemented method of claim 1, wherein the at least one hot-spare node is implemented in virtual spare hardware.

5. An apparatus for utilizing hot-spare nodes in a storage network, comprising:

a storage network having a deduplication fingerprints database, wherein the deduplication fingerprints database eliminates redundant data, at least one active node including an active node storage, and at least one hot-spare node including a hot-spare node storage, wherein the at least one active node does not include any hot-spare node storage, wherein the deduplication fingerprints database is distributed between the at least one active node and the at least one hot-spare node during a non-failure operation of the storage network, wherein the non-failure operation of the storage network includes the at least one active node in a functioning state, the at least one active node and the at least one hot-spare node comprising:

a first portion of unique fingerprints of the deduplication fingerprints database being stored on the active node storage of the at least one active node, wherein the first portion of unique fingerprints corresponds to data that is not redundantly stored; and a second portion of unique fingerprints of the deduplication fingerprints database being stored on the hot-spare node storage of the at least one hot-spare node that is explicitly separated from the at least one active node and the active node storage during the non-failure operation of the storage network, wherein the second portion of unique fingerprints corresponds to data that is not redundantly stored, wherein, relative to the at least one active node, the at least one hot-spare node does not serve input/output (I/O) operations and includes a larger memory allocation for storing the deduplication fingerprints database during the non-failure operation of the storage network, wherein a deduplication ratio of the storage network is improved during the non-failure operation of the storage network, responsive to data associated with the stored second portion of unique fingerprints of the deduplication fingerprints database being provided from the at least one hot-spare node;

wherein responsive to a failure operation of the storage network, wherein the failure operation includes a failed active node of the at least one active node, one of the at least one hot-spare node is configured to retain a portion of the first portion of unique fingerprints of the deduplication fingerprints database associated with data stored on the failed active node, wherein the at least one hot-spare node is dedicated to retaining the portion of the first portion of unique fingerprints of the deduplication fingerprints database associated with data stored on the failed active node;

wherein the failed active node is configured to be replaced with the one of the at least one hot-spare node; and wherein the at least one hot-spare node comprises a non-volatile storage in which suspended fingerprints from the deduplication fingerprints database are stored while the at least one hot-spare node is replacing the failed active node, wherein the suspended fingerprints were stored on the failed active node, and in response to the failed active node returning to an online state, the suspended fingerprints are paged from the non-volatile storage to restore the suspended fingerprints to the failed active node.

6. The apparatus of claim 5, wherein the at least one hot-spare node further comprises a non-volatile memory in which additional cold fingerprints are stored, the additional cold fingerprints previously in use but not presently in use in said deduplication fingerprints database.

7. The apparatus of claim 5, wherein the at least one hot-spare node is shared between more than one storage network.

8. The apparatus of claim 5, wherein the at least one hot-spare node is implemented in virtual spare hardware.

9. A computer program product for utilizing hot-spare nodes in a storage network, the storage network having a deduplication fingerprints database and a plurality of nodes, wherein the deduplication fingerprints database eliminates redundant data, comprising at least one active node including an active node storage and at least one hot-spare node including a hot-spare node storage, wherein the at least one active node does not include any hot-spare node storage, the computer program product comprising:

a computer readable storage medium having program instructions embodied therewith, the program instructions comprising:

program instructions to distribute the deduplication fingerprints database between the at least one active node and the at least one hot-spare node during a non-failure operation of the storage network, wherein the non-failure operation of the storage network includes the at least one active node in a functioning state;

program instructions to store, on the active node storage of the at least one active node, a first portion of unique fingerprints of the deduplication fingerprints database, wherein the first portion of unique fingerprints corresponds to data that is not redundantly stored;

program instructions to store, on the hot-spare node storage of the at least one hot-spare node that is explicitly separated from the at least one active node and the active node storage, a second portion of unique fingerprints of the deduplication fingerprints database during a non-failure operation of the storage network, wherein the second portion of unique fingerprints corresponds to data that is not redundantly stored, wherein, relative to the at least one active node, the at least one hot-spare node does not serve input/output (I/O) operations and includes a larger memory allocation for storing the deduplication fingerprints database during the non-failure operation of the storage network;

program instructions to, responsive to providing, during the non-failure operation of the storage network, data from the at least one hot-spare node associated with the stored second portion of unique fingerprints of the deduplication fingerprints database, improving a deduplication ratio of the storage network during the non-failure operation of the storage network;

program instructions to, responsive to a failure operation of the storage network, wherein the failure operation includes a failed active node of the at least one active node, retain on one of the at least one hot-spare node, a portion of the first portion of unique fingerprints of the deduplication fingerprints database associated with data stored on the failed active node, wherein the at least one hot-spare node is dedicated to retaining the portion of the first portion of unique fingerprints of the deduplication fingerprints database associated with data stored on the failed active node;

program instructions to replace the failed active node with the one of the at least one hot-spare node;

program instructions to store suspended fingerprints from the deduplication fingerprints database in a non-volatile storage associated with the at least one hot-spare node while the at least one hot-spare node is replacing the failed active node, wherein the suspended fingerprints were stored on the failed active node; and program instructions to, responsive to the failed active node returning to an online state, page the suspended fingerprints from the non-volatile storage to restore the suspended fingerprints to the failed active node.

10. The computer program product of claim 9, wherein the at least one hot-spare node comprises a non-volatile memory, the program instructions further comprising instructions to store additional cold fingerprints, previously, but not presently, in use in said deduplication fingerprints database in said non-volatile memory.

11. The computer program product of claim 9, wherein the at least one hot-spare node is shared between more than one storage network.

12. The computer program product of claim 9, wherein the at least one hot-spare node is implemented in virtual spare hardware.

* * * * *